(12) United States Patent
Kruger et al.

(10) Patent No.: US 12,299,507 B1
(45) Date of Patent: May 13, 2025

(54) CUSTOM EVENT DEFINITION FOR A HARDWARE DEVICE USING A NON-HARDWARE DEVICE SUPPORTED WIRELESS NETWORKING PROTOCOL

(71) Applicant: Starbucks Corporation, Seattle, WA (US)

(72) Inventors: Joshua J. Kruger, Seattle, WA (US); Todd Alan Buiten, Kent, WA (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 18/440,817

(22) Filed: Feb. 13, 2024

(51) Int. Cl.
*G06F 9/54* (2006.01)

(52) U.S. Cl.
CPC .................... *G06F 9/542* (2013.01)

(58) Field of Classification Search
None
See application file for complete search history.

(56) References Cited

U.S. PATENT DOCUMENTS

| | | | |
|---|---|---|---|
| 7,322,201 B2 | 1/2008 | Brunner et al. | |
| 9,885,511 B2 | 2/2018 | Brunner et al. | |
| 10,501,972 B2 | 12/2019 | Twiggar, III et al. | |
| 11,941,385 B1 * | 3/2024 | Pinski | G06F 8/51 |
| 2002/0016867 A1 * | 2/2002 | Kampe | G06F 9/542 |
| | | | 719/318 |
| 2012/0102477 A1 * | 4/2012 | Kim | G06F 8/654 |
| | | | 717/169 |
| 2012/0198478 A1 * | 8/2012 | Jennings | G06F 9/542 |
| | | | 719/318 |
| 2014/0091923 A1 * | 4/2014 | Heninwolf | H04L 51/52 |
| | | | 340/539.11 |
| 2014/0201145 A1 * | 7/2014 | Dorman | G06F 16/178 |
| | | | 707/634 |
| 2018/0248983 A1 | 8/2018 | Mohebbi et al. | |
| 2018/0276055 A1 * | 9/2018 | Furuichi | G06F 9/542 |
| 2020/0033163 A1 * | 1/2020 | Agarwal | G06N 20/00 |

FOREIGN PATENT DOCUMENTS

| | | |
|---|---|---|
| CN | 107769834 | 5/2020 |
| WO | WO 2018/190568 A1 | 10/2018 |

* cited by examiner

*Primary Examiner* — Umut Onat
(74) *Attorney, Agent, or Firm* — Knobbe, Martens, Olson & Bear, LLP

(57) ABSTRACT

Systems and methods are provided to implement a computing device that is physically connected to a hardware device. The computing device can identify first event definitions including one or more event parameters and/or a time period. The computing device can obtain first event data from the hardware device according to the first event definitions. The hardware device may provide second event data according to second event definitions to a computing system using a first wireless networking protocol. Based on the first event definitions, the computing device can transform the first event data and route the transformed event data using a second wireless networking protocol to the computing system, via an intermediary system.

26 Claims, 7 Drawing Sheets

US 12,299,507 B1

CUSTOM EVENT DEFINITION FOR A HARDWARE DEVICE USING A NON-HARDWARE DEVICE SUPPORTED WIRELESS NETWORKING PROTOCOL

FIELD

The present disclosure generally relates to a computing device for defining events from event data.

BACKGROUND

Hardware devices may generate event data (e.g., sensor data).

Figure 1A:
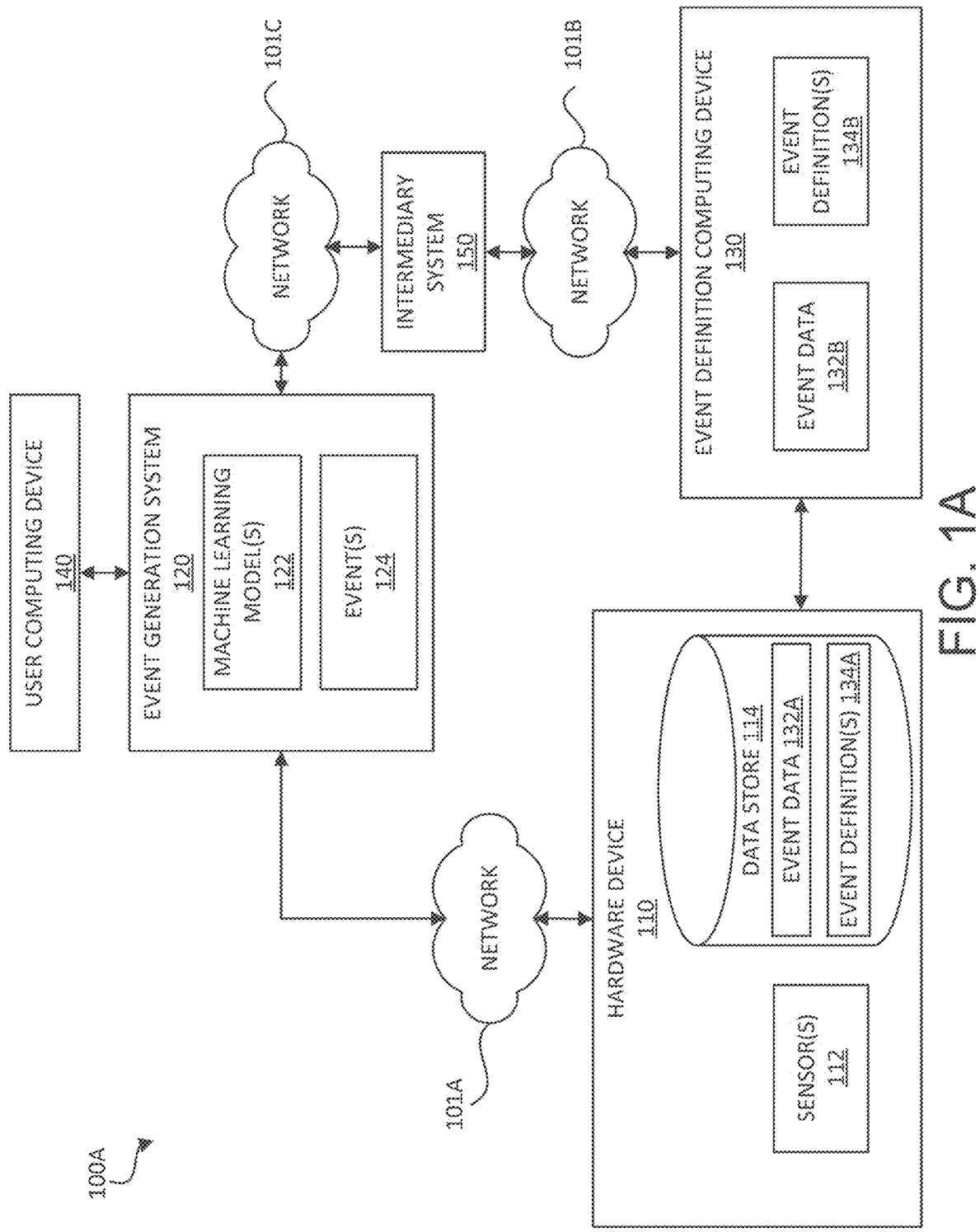
FIG. 1A is a block diagram depicting an illustrative environment in which an event definition computing device can obtain event data for custom event definition.

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

DETAILED DESCRIPTION

A physical environment (e.g., a store, a building, a work center, a facility, etc.) may include a plurality of hardware devices (e.g., physical machines, physical devices, etc.). For example, the plurality of hardware devices may be physically located at, may be hardwired to, may be connected to, etc. the physical environment. The plurality of hardware devices may be dynamic in that hardware devices may be removed from the environment, added to the environment, turned off, initialized, etc.

The plurality of hardware devices may include components (e.g., computing systems, computing devices, sensors, motors, etc.) that perform one or more functions. For example, the plurality of hardware devices may include components to heat coffee. The plurality of hardware devices may include any hardware devices that generate event data (e.g., sensor data) and/or capture event data. For example, the plurality of hardware devices may include ice machines, coffee makers, freezers, refrigerators, stoves, ovens, heated racks (e.g., warming walls), microwaves, dispensers, etc.

All or a portion of plurality of physical environments may include a respective plurality of hardware devices. For example, a first physical environment may include a first plurality of hardware devices, a second physical environment may include a second plurality of hardware devices, etc. In some cases, a plurality of physical environments may include the same hardware device (e.g., the same type of hardware device). For example, a first physical environment may include an ice machine, a second physical environment may include the same type of ice machine, etc. Further, all or a portion of the plurality of physical environments may include a plurality of the same hardware devices. For example, a physical environment may include a plurality of ice machines.

The plurality of hardware devices may have settings (e.g., parameters, instructions, code, etc.). For example, the settings of the plurality of hardware devices may be based on software and/or firmware installed on the plurality of hardware devices that cause the plurality of hardware devices to perform one or more functions (e.g., the firmware may cause a hardware device to perform data collection according to one or more event definitions defined within the firmware). The settings may indicate how a respective hardware device is to operate. For example, the settings may indicate a mapping of a particular input to a particular output (e.g., the hardware device is to turn on in response to a button press, the hardware device is to dispense coffee in response to a received command, etc.), operating parameters (e.g., a temperature, a humidity, etc. at which to maintain the hardware device), event definitions (e.g., event parameters indicating how to define events and/or a time period indicating a time period at which to provide event data), etc.

In traditional systems, updating and/or modifying the settings (e.g., the one or more event definitions) of such hardware devices may be a difficult and time consuming process (e.g., to modify how the plurality of hardware devices perform data collection). For example, updating and/or modifying the settings of such hardware devices may be based on manually updating the software and/or firmware installed on the plurality of hardware devices (e.g., manually updating the one or more event definitions defined within the firmware).

As the plurality of hardware devices may not be connected to a network (e.g., may not include a network interface) and/or may not be updatable via a network connection, such an update may be time consuming and/or inefficient. For example, while data may be read from the plurality of hardware devices via a network connection, the plurality of hardware devices may not be controllable and/or updatable via the network connection such that the settings of the plurality of hardware devices may not be updated via the network connection.

In such systems, an update to the settings of the plurality of hardware devices may be based on a manual update of the firmware installed on the plurality of hardware devices. To update the settings of the plurality of hardware devices (e.g., to change how events are defined, a time period for defining and/or providing events, etc.), a user may be limited to individually accessing and updating the settings of all or a portion of the plurality of hardware devices (e.g., manually updating the firmware of each of the plurality of hardware devices). As the number of physical environments may be any number (e.g., hundreds, thousands, etc.) and the number of hardware devices included at all or a portion of the physical environments may be any number, individually accessing and updating the settings of all or a portion of the plurality of hardware devices may be inefficient and time consuming. For example, a user computing device may manually provide updated firmware to all or a portion of the plurality of hardware devices to update the event definitions for the plurality of hardware devices. However, manually pushing such updated settings may not only be time consuming and inefficient, but may also consume excessive network bandwidth. This may lead to an inadequate user experience as a user may be unable to update settings in an efficient manner.

In some cases, in traditional systems, all or a portion of the plurality of hardware devices may not be connected to a network. For example, the plurality of hardware devices may include hardware devices that generate data (e.g., sensor data), however, the hardware devices may not include a network interface to communicate the data to a computing system. Further, in such cases, the user computing device may be unable to manually provide updated settings to all or a portion of the plurality of hardware devices to update the settings for the plurality of hardware devices via a network connection. Instead, to update the settings of the hardware devices, a user may initiate a wired connection between the hardware devices and the user computing device and the user may provide the updated settings via the wired connection. However, manually providing such updated settings via a wired connection may be time consuming and inefficient as a user may initiate a wired connection between each of the hardware devices and the user computing devices. This may lead to an inadequate user experience as a user may be unable to update settings in an efficient manner.

Therefore, in traditional systems, there may be a significant delay between identifying an update to the settings and updating the settings. For example, a computing system may identify an update to the settings (e.g., may recommend an update to the settings based on sensor data), may provide the update to the user computing device, and the user computing device may manually push the update (e.g., via a wired or wireless connection) to all or a portion of the plurality of hardware devices.

This may be problematic to the user experience, as the update may cause an improved (e.g., more efficient, more secure, etc.) operation of the plurality of hardware devices as compared to the current operation of the plurality of hardware devices such that continued operation of the plurality of hardware devices without being updated may be inefficient and/or undesirable.

To address these or other concerns, disclosed herein is a computing device (e.g., an event definition computing device) physically connected to the hardware device that enables the update to a hardware device to be avoided. For example, the computing device can obtain settings (e.g., updated settings as compared to settings of the hardware device) and can perform one or more functions (e.g., process data associated with the hardware device) according to the settings without sending the settings to the hardware device. As the settings of the hardware device may not be updated or modified, the hardware device may continue to push data according to the settings (e.g., the original settings) while the computing device may pull data from the hardware device according to different settings (e.g., modified or updated settings). By the computing device pulling data from the hardware device according to the different settings, a manual update of the settings of the hardware device can be avoided. While the dual push and pull of the data may result in multiple copies of the data being output (e.g., to the computing system), by avoiding the manual update of the settings of the hardware device, the efficiency of such systems can be increased while also improving the user experience. It will be understood that while reference may be made to specific settings such as event definitions, the disclosed computing device may obtain any settings as discussed herein.

In the example of the computing device obtaining event definitions, the computing device may obtain and transform event data according to event definitions. The computing device may include one or more ports and may connect to one or more hardware devices via a wired connection between the one or more ports of the computing device and one or more ports of the one or more hardware devices. For example, the computing device may include one or more pins (e.g., data pins) that are connected (e.g., physically) to one or more pins of the one or more hardware devices by one or more physical connections (e.g., wires).

As discussed herein, a hardware device may include one or more components that generate event data. In some cases, the hardware device may route (e.g., push) the event data to a computing system according to particular event definitions. For example, the hardware device may be preprogrammed with the event definitions (e.g., as part of a setup process). The hardware device may route the event data to a computing system using a first wireless networking protocol (e.g., a first wireless network protocol), a first wireless network, etc. For example, the hardware device may route the event data to the computing system using Wi-Fi. As discussed herein, the computing device may pull the event data (or a subset of the event data) and route the event data using a second wireless networking protocol (e.g., a second wireless network protocol), a second wireless network, etc. For example, the second wireless networking protocol may be a Low Power Wide Area Networking communication protocol using a long range ("LoRa") physical layer ("LoRaWAN").

The computing device may obtain event definitions (e.g., different from the event definitions used by the hardware device, updated event definitions as compared to the event definitions used by the hardware device, etc.) from a user computing device. The event definitions may include (e.g., may indicate) event parameters and/or a time period. For example, the event parameters may indicate a field (e.g., a data field, a key, etc.), a field value (e.g., a data field value, a key value, etc.), a particular sensor (e.g., a temperature sensor, a humidity sensor, etc.), a threshold (e.g., a threshold range, a threshold value, etc.), a range of data (e.g., data received within a time period), a type of data (e.g., time data), etc. In another example, the time period may indicate a time period at which to obtain event data, a time period at which to provide the event data to a computing system, a time period of which the event data should correspond to (e.g., by generated by the hardware device), etc.

Based on the event definitions, the computing device may obtain event data (e.g., sensor data) from a hardware device via a physical connection between the computing device and the hardware device. For example, the computing device may request the event data from the hardware device, prompt the hardware device to provide the event data, query a data store (e.g., memory) of the hardware device to identify the event data, read the event data from the hardware device, etc.

To obtain the event data based on the event definitions, the computing device may obtain the event data based on a time period identified within the event definitions (e.g., every ten seconds, every thirty seconds, etc.). For example, to obtain the event data based on the event definitions, the computing device may obtain the event data and route the event data to a computing system based on a time period identified within the event definitions (e.g., every ten seconds, every thirty seconds, etc.). In another example, the computing device may obtain the event data from the hardware device based on the time period (e.g., every ten seconds).

To obtain the event data based on the event definitions, the computing device may obtain the event data based on event parameters identified within the event definitions. For example, the computing device may obtain particular event data that satisfies the event parameters. In another example, the computing device may transform (e.g., filter, aggregate, process, etc.) obtained event data such that the transformed event data satisfies the event parameters. For example, the computing system may transform the obtained event data to generate one or more events.

Based on obtaining the event data, the computing device may route the event data (e.g., the transformed event data) and/or the generated events to an intermediary system (e.g., a network gateway, a gateway device, etc.). In some cases, the computing device may route the event data to an intermediary system via a second wireless network using a second wireless networking protocol (e.g., LoRaWAN).

The second wireless networking protocol (e.g., LoRaWAN) may be more secure, use less power, may offer more long-range connectivity, etc. as compared to the first wireless networking protocol (e.g., WiFi) such that a computing system can obtain event data from multiple hardware devices via multiple physical devices using the second wireless networking protocol in a more secure manner, using less power, and over a greater range as compared to event data obtained directly from the hardware devices using the first wireless networking protocol. While the event definitions utilized by the computing device may indicate a shorter time period (e.g., every 10 seconds) as compared to the time period indicated by the event definitions utilized by the hardware device (e.g., every minute), as the computing device may route data using a wireless networking protocol that utilizes less power as compared to the wireless networking protocol utilized by the hardware device, the overall power consumption for the event generation process may not increase.

The intermediary system may route event data (and/or the generated events) to the computing system. The computing system may process the event data (e.g., generate events based on the event data), analyze the event data, etc. In some cases, the computing system may implement one or more machine learning models, may provide the event data (or the generated events) to the one or more machine learning models, and obtain an output. In some cases, the computing system may generate an alert based on the event data, the output of the one or more machine learning models, and/or the generated events. The computing system may route the event data, the events, the output of the one or more machine learning models, the alert, etc. to a user computing device. For example, the computing system may cause display of the event data, the events, the output of the one or more machine learning models, the alert, etc.

The computing system may route updated event definitions (e.g., based on an input provided by the user computing device) to the computing device. For example, the computing system may route the updated event definitions to the intermediary system and the intermediary system may route the updated event definitions to the computing device.

In some cases, the intermediary system and the hardware device may route event data to the same computing system. However, the event data routed by the intermediary system may be different as compared to the event data routed by the hardware device as the computing device may route event data to the intermediary system according to different event definitions (e.g., updated event definitions) as compared to the event definitions used by the hardware device.

In light of the description herein, it will be understood that the embodiments disclosed herein substantially improve the efficiency of updating settings (e.g., firmware) across a fleet of hardware devices that may include any of thousands of hardware devices without directly providing the updated settings to the hardware devices. Specifically, the embodiments disclosed herein enable the custom event definitions to be used by a computing device to define events and route event data and/or events to a computing system. The ability to automatically update settings in such a manner reduces complexity, effort, and training burden to update the settings. Furthermore, by the computing device using a wireless networking protocol that is different as compared to the wireless networking protocol used by the hardware device, the security and range of the update process and the event identification process can be increased while the power usage of the update process and the event identification process can be decreased.

I. Environment Overview

FIG. 1A is a block diagram of an illustrative operating environment 100A which includes a user computing device 140 (e.g., a computing device associated with a user, a computing device associated with a particular physical environment, etc.), an event generation system 120 (e.g., an event generation computing system), a hardware device 110, an event definition computing device 130, and an intermediary system 150 (e.g., an intermediary computing system, an intermediate system, etc.). The hardware device 110 may interact with (e.g., communicate with) the event generation system 120 via the network 101A. The event definition computing device 130 may interact with the intermediary system 150 via the network 101B and the intermediary system 150 may interact with the event generation system 120 via the network 101C.

The hardware device 110 may be any hardware device implemented within one or more physical environments. For example, the hardware device 110 may be an ice machine, a coffee maker, a freezer, a refrigerator, a stove, an oven, a heated rack, a microwave, a dispenser, etc. The hardware device 110 may include one or more ports to physically connect with the event definition computing device 130. In some cases the environment 100A may include a plurality of hardware devices.

The event generation system 120 may include and/or may be one or more computing systems implementing one or more machine learning models 122 (e.g., large language models).

The event definition computing device 130 (and the intermediary system 150) may act as an interface between the event generation system 120 and the hardware device 110. For example, the event definition computing device 130 (and the intermediary system 150) may enable communications between the event generation system 120 and the hardware device 110 and/or may enable communications between the event generation system 120 and the hardware device 110 via a wireless networking protocol not supported by the hardware device 110 (e.g., via a non-hardware device supported wireless networking protocol).

By way of illustration, various types of user computing devices 140 may be in communication with the event generation system 120, including a desktop computer, laptop, and a mobile phone. In general, the user computing device 140 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The event generation system 120 may provide the user computing device 140 with one or more user interfaces, command-line interfaces (CLI), application programing interfaces (API), and/or other interfaces for displaying one or more objects (e.g., as part of a computer display). Although one or more embodiments may be described herein as using a user interface, it should be appreciated that such embodiments may, additionally or alternatively, use any CLIs, APIs, or other interfaces.

Hardware Device

The hardware device 110 may include one or more components (e.g., sensors), sub-systems, etc. As shown in the example of FIG. 1A, the hardware device 110 includes one or more sensors 112. In some cases, the one or more sensors 112 may include a voltage sensor, a current sensor, a temperature sensor, a humidity sensor, an image sensor, an audio sensor, a network sensor, a flow sensor, a gyroscope, a clock, etc. In some cases, the hardware device 110 may be in communication with one or more remote sensors (e.g., sensors remote to the hardware device 110). For example, the hardware device 110 may obtain event data from the one or more remote sensors.

The one or more sensors 112 may generate event data 132A (e.g., sensor data, raw machine data, configuration parameters, statistics, etc.) and store the event data 132A in the data store 114 of the hardware device 110. For example, the event data 132A may include compressor cycle data, voltage data, current data, humidity data, temperature data, image data, audio data, network connection status, update status, component status, water flow data, vibration data, identification data, error data, log data, alert data, and/or time data. In some cases, the hardware device 110 may monitor the one or more sensors 112, obtain sensor data generated by the one or more sensors 112 based on monitoring the one or more sensors 112, and process the sensor data to generate the event data 132A. In some cases, the hardware device 110 may generate one or more events based on the event data 132A.

The hardware device 110 may generate (e.g., define) the event data 132A according to one or more event definitions 134A (e.g., one or more event parameters, a time period, etc.). For example, the one or more event parameters may indicate a field, a field value, a particular sensor of the one or more sensors 112, a threshold, a range of data, a type of data, etc. The hardware device 110 may be preprogrammed with the one or more event definitions 134A. For example, the hardware device 110 may be preprogrammed with the one or more event definitions 134A during installation of the hardware device 110 within a physical environment. As the hardware device 110 may be preprogrammed with the one or more event definitions 134A, an update to the one or more event definitions 134A utilized by the hardware device 110 may include updating the firmware via a physical connection with the hardware device 110.

The hardware device 110 may include a network interface. The hardware device 110 may interact with the event generation system 120 using the network interface via the network 101A. For example, the hardware device 110 may provide the event data 132A (and/or events generated based on the event data 132A) to the event generation system 120 using the network interface via the network 101A. The hardware device 110 may be configured to push the event data 132A (e.g., periodically) to the event generation system 120 according to the one or more event definitions 134A.

In some cases, the hardware device 110 may include one or more ports (e.g., docking points, connection points, receptacles, etc.). For example, the hardware device 110 may include one or more serial ports to physically connect the hardware device 110 and the event definition computing device 130.

Event Definition Computing Device

The event definition computing device 130 (e.g., an event definition module) may be connected (e.g., physically) to the hardware device 110. For example, the event definition computing device 130 may include one or more ports (e.g., docking points, connection points, receptacles, etc.). In some cases, the event definition computing device 130 may be compatible with different types of hardware devices (e.g., ice machines, coffee makers, freezers, refrigerators, stoves, ovens, heated racks, microwaves, dispensers, etc.). For example, the event definition computing device 130 may be configured to physically connect with and obtain event data from ice machines, coffee makers, freezers, refrigerators, stoves, ovens, heated racks, microwaves, dispensers, etc. In some cases, the event definition computing device 130 may physically connect to multiple hardware devices (e.g., simultaneously) and may obtain event data from all or a portion of the hardware devices physically connected to the event definition computing device 130 (e.g., simultaneously).

The event definition computing device 130 may obtain at least a portion of the event data 132A via the one or more ports. For example, the event definition computing device 130 may read (e.g., pull) the at least a portion of the event data 132A from the one or more ports of the hardware device 110 (e.g., as provided by the one or more sensors 112, as stored in the data store 114, etc.). In another example, the event definition computing device 130 may prompt (e.g., provide a request to, query, command, etc.) the hardware device 110 to provide the at least a portion of the event data 132A.

In some cases, the event definition computing device 130 may include and/or may be one or more sensors. For example, the event definition computing device 130 may include and/or may be a LoRa sensor. The event definition computing device 130 may utilize the one or more sensors to obtain least a portion of the event data 132A from the hardware device 110.

In some cases, the event definition computing device 130 may obtain the at least a portion of the event data 132A according to one or more event definitions 134B (e.g., one or more event parameters, a time period, etc.). For example, the event definition computing device 130 may request at least a portion of the event data 132A that satisfies the one or more event definitions 134B (e.g., includes one or more fields, includes one or more field values, is generated by a particular sensor, is within a particular range, is greater than, less than, or matches a particular threshold, is a particular type of data, etc.). Based on obtaining the at least a portion of the event data 132A according to the one or more event definitions 134B, the event definition computing device 130 may identify the at least a portion of the event data 132A as event data 132B.

In some cases, the event definition computing device 130 may obtain the event data 132A and may transform the event data 132A according to the one or more event definitions 134B. For example, the event definition computing device 130 may process, filter, aggregate, etc. the event data 132A according to the one or more event definitions 134B. The event definition computing device 130 may generate the event data 132B based on the transformed event data 132A. For example, the event data 132B may include transformed event data 132A.

In one example of transforming the event data 132A, the event definition computing device 130 may break the event data 132A into separate fields (e.g., indicated by the one or more event definitions 134B). In another example of transforming the event data 132A, the event definition computing device 130 may compare the event data 132A to event data 132A previously obtained by the event definition computing device 130 (e.g., to identify state changes) and/or previously output to the event generation system 120, identify a portion of the event data 132A (e.g., particular fields) that has not changed relative to the event data 132A previously obtained based on the comparison, and filter the portion of the event data 132A from the event data 132A to obtain the event data 132B.

In some cases, the event data 132A and the event data 132B may include the same event data. For example, the event definition computing device 130 may obtain the event data 132A and route the event data 132A to the event generation system 120 via the intermediary system 150.

Whereas the hardware device 110 may push event data 132A to the event generation system 120, the event definition computing device 130 may pull at least a portion of the event data 132A from the hardware device 110 for generation of the event data 132B and may provide the pulled event data to the event generation system 120. Further, the event definition computing device 130 may force the hardware device 110 to handover event data according to event definitions that may be different as compared to the event definitions that the hardware device 110 is configured to utilize to generate and provide event data 132A.

The event definition computing device 130 may periodically or aperiodically obtain the one or more event definitions 134B. For example, the event definition computing device 130 may periodically or aperiodically obtain updates to the one or more event definitions 134B. In some cases, the event definition computing device 130 may obtain the one or more event definitions 134B and/or updates to the one or more event definitions 134B from the user computing device 140.

Network

As discussed above, the hardware device 110 may interact with the event generation system 120 via the network 101A, the event definition computing device 130 may interact with the intermediary system 150 via the network 101B, and the intermediary system 150 may interact with the event generation system 120 via the network 101C. In some cases, two or more of the network 101A, the network 101B, and/or the network 101C may be the same network. In some cases, the network 101B may be a different network as compared to the network 101A and 101C. The network 101A, the network 101B, and/or the network 101C may be or may include a wired network and/or a wireless network.

The network 101A, the network 101B, and/or the network 101C may be a personal area network, local area network, wide area network, over-the-air broadcast network (e.g., for radio or television), cable network, satellite network, cellular telephone network, or combination thereof. As a further example, the network 101A, the network 101B, and/or the network 101C may be a publicly accessible network of linked networks, possibly operated by various distinct parties, such as the Internet. In some embodiments, the network 101A, the network 101B, and/or the network 101C may be a private or semi-private network, such as a corporate or university intranet. The network 101A, the network 101B, and/or the network 101C may include one or more wireless networks, such as a Global System for Mobile Communications (GSM) network, a Code Division Multiple Access (CDMA) network, a Long Term Evolution (LTE) network, or any other type of wireless network. The network 101A, the network 101B, and/or the network 101C can use protocols and components for communicating via the Internet or any of the other aforementioned types of networks. For example, the protocols used by the network 101A, the network 101B, and/or the network 101C may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein. In one example, the network 101A and/or the network 101C may be the internet and the network 101B may be LoRa.

The network 101A, the network 101B, and the network 101C may correspond to different wireless networking protocols (e.g., devices may utilize respective wireless networking protocols to communicate via the respective network). For example, the network 101A and/or the network 101C may correspond to WiFi and the network 101B may correspond to LoRaWAN.

The hardware device 110 may not support a wireless networking protocol used by the event definition computing device 130 to communicate via the network 101B such that the event definition computing device 130 can perform custom event definition for the hardware device 110 using a non-hardware device supported wireless networking protocol (e.g., the hardware device 110 may not support LoRaWAN).

Intermediary System

The intermediary system 150 may include one or more gateways, gateway devices, edge devices, internet of things ("IoT") gateways, edge computing devices, edge gateways, etc. For example, the intermediary system 150 may be a LoRa gateway, a LoRaWAN gateway, etc.

The intermediary system 150 may obtain the event data 132B (and/or one or more events generated based on the event data 132B) from the event definition computing device 130. The intermediary system 150 may obtain the event data 132B from the event definition computing device 130 via the network 101B (using the second wireless networking protocol). The intermediary system 150 may route the event data 132B (and/or the one or more events) to the event generation system 120 via the network 101C (using a third wireless networking protocol). In some cases, the intermediary system 150 may transform (e.g., process) the event data 132B (and/or the one or more events) and may route the transformed event data (and/or the transformed one or more events) to the event generation system 120.

In some cases, the environment 100A may not include the intermediary system 150. The event definition computing device 130 may route the event data 132B (and/or the one or more events) (e.g., directly) to the event generation system 120. For example, the event definition computing device 130 may route the event data 132B (e.g., directly) to the event generation system 120 via the network 101B (e.g., using the second wireless networking protocol).

Event Generation System

As discussed above, the event generation system 120 may include one or more computing systems. The event generation system 120 may be implemented directly in hardware or software executed by hardware devices and may, for instance, include one or more physical or virtual servers implemented on physical computer hardware configured to execute computer executable instructions for performing various features that will be described herein. For example, the event generation system 120 may be a cloud computing system, a backend server, etc.

The event generation system 120 may process event data 132A, 132B (e.g., received from the event definition computing device 130 via the intermediary system 150, received from the hardware device 110, etc.) to generate one or more events 124. In some cases, the event generation system 120 may obtain the one or more events 124 from the event definition computing device 130 (e.g., the event definition computing device 130 may generate the one or more events). In some cases, to generate the one or more events 124, the event generation system 120 and/or the event definition computing device 130 may group, aggregate, filter, etc. portions of the event data 132B based on the one or more event definitions 134B. For example, the event generation system 120 and/or the event definition computing device 130 may group one or more fields and/or field values of the event data 132B to generate one or more events 124B.

In some cases, the event generation system 120 may obtain the event data 132A (and/or the one or more events) from the hardware device 110 and/or the event data 132B (and/or the one or more events) from the event definition computing device 130. For example, the event generation system 120 may obtain the event data 132A (and/or the one or more events) from and generated by the hardware device 110 according to the one or more event definitions 134A and may obtain the event data 132B (and/or the one or more events) from and generated by the event definition computing device 130 according to the one or more event definitions 134B.

In some cases, the event generation system 120 may filter the event data 132A, the event data 132B, and/or the one or more events 124 to remove event data and/or events provided by and/or generated by the hardware device 110 (e.g., to remove event data 132A and/or events generated using the one or more event definitions 134A). In some cases, the event generation system 120 may filter the event data 132A, the event data 132B, and/or the one or more events 124 to remove copies of an event and/or event data (e.g., event data and/or event generated by the hardware device 110 and the event definition computing device 130).

As discussed above, the event generation system 120 may process the one or more events 124 to generate one or more alerts. In some cases, the event generation system 120 may process the one or more events 124 using one or more machine learning models 122 to identify an output (e.g., an alert, a predicted performance of the hardware device 110, a status of the hardware device 110, etc.). For example, the event generation system 120 may process events (e.g., using the one or more machine learning models 122) that include and/or indicate a voltage value, a current value, a vibration value, etc., and based on the events, the event generation system 120 may predict that the hardware device 110 will enter an error state, indicate that a component (e.g., a filter, a motor, etc.) of the hardware device 110 is to be replaced, generate a performance for the hardware device 110 (e.g., an efficiency), etc. In one example, the one or more machine learning models may be trained using training event data to output a particular output based on input event data.

The event generation system 120 may provide the event data 132A, 132B, the one or more events 124, the output of the one or more machine learning models 122, etc. to the user computing device 140. For example, the event generation system 120 may cause display of an output based on the event data 132A, 132B, the one or more events 124, the output of the one or more machine learning models 122, etc. via a user interface of the user computing device 140.

User Computing Device

As discussed above, the user computing device 140 may be a computing device associated with a user. The user computing device 140 may receive the event data 132A, 132B, the one or more events 124, the output of the one or more machine learning models 122, etc. from the event generation system 120.

In some cases, the user computing device 140 may define one or more event definitions 134B (e.g., updated event definitions). For example, the user computing device 140 may obtain an input (e.g., a user input) and may update previously defined one or more event definitions 134B based on the input. The user computing device 140 may route the one or more event definitions 134B to the event generation system 120 which may route the one or more event definitions 134B to the event definition computing device 130 via the intermediary system 150. The event definition computing device 130 may obtain event data according to the obtained one or more event definitions 134B. In some cases, the user computing device may route the one or more event definitions 134B directly to the intermediary system 150 and/or the event definition computing device 130.

The one or more event definitions 134B may indicate a definition of a custom event (e.g., indicating one or more fields, field values, sensors, etc. of the event data for the custom event). In one example, the one or more event definitions 134B may indicate that the custom event is to include voltage data, current data, and error data over a particular time period from the event data. In another example, the one or more event definitions 134B may indicate that the custom event is to include vibration data and water flow data from the event data. The one or more event definitions 134B may indicate how the custom event is to be generated (e.g., an order or priority of data within the custom event). For example, the one or more event definitions 134B may indicate that current data and time data are to be appended to voltage data to form the custom event (e.g., voltage data is to be followed by current data which is to be followed by time data).

In some cases, the one or more event definitions 134B may be user specific while the one or more event definitions 134A may be generic event definitions. For example, the one or more event definitions 134B may be dynamic event definitions while the one or more event definitions may be static event definitions. In some cases, the event definition computing device 130 may update the one or more event definitions 134B based on an input (e.g., received from the user computing device 140 and indicative of the input). To update the one or more event definitions 134A, a user may manually update firmware of the hardware device 110. In some cases, the hardware device 110 may be unable to directly or dynamically update the one or more event definitions 134A. For example, the hardware device 110 may be unable to update the one or more event definitions 134A without a manual update of the firmware. In some cases, the hardware device 110 may be unable to update the one or more event definitions 134A without a particular delay (e.g., 10 minutes, an hour, a day, etc.) due to the manual nature of the update while the event definition computing device 130 may update the one or more event definitions 134B with a comparatively shorter delay (e.g., 10 seconds, 20 seconds, etc.)

Non-Networked Hardware Device

Figure 1B:
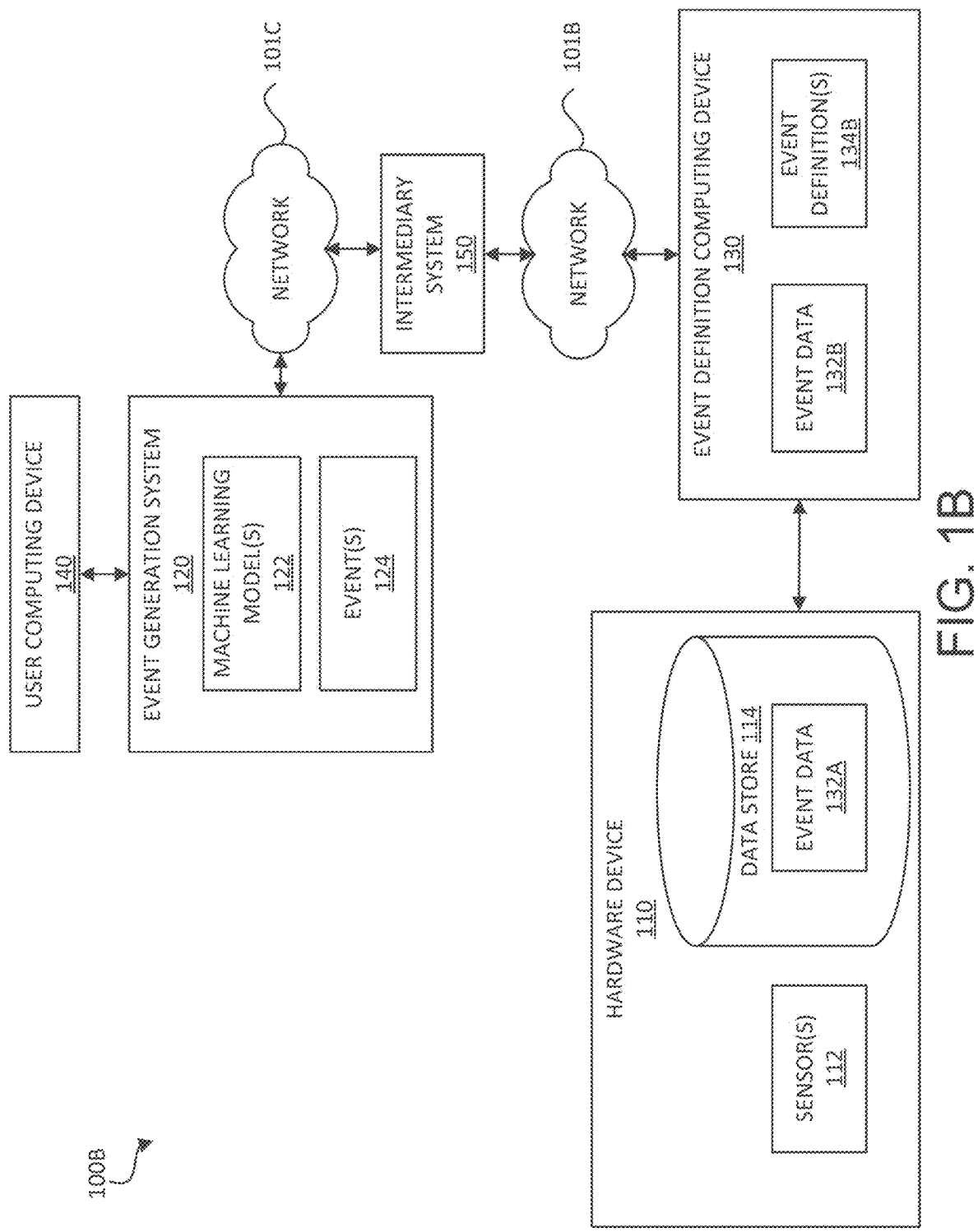
FIG. 1B is a block diagram depicting an illustrative environment in which an event definition computing device can obtain event data for custom event definition.

FIG. 1B is a block diagram of an illustrative operating environment 100B which includes the user computing device 140, the event generation system 120, the hardware device 110, the event definition computing device 130, and the intermediary system 150 as discussed herein. The hardware device 110 may interact with event definition computing device 130 (e.g., via a physical connection between the hardware device 110 and the event definition computing device 130). As discussed herein, the event definition computing device 130 may interact with the intermediary system 150 via the network 101B and the intermediary system 150 may interact with the event generation system 120 via the network 101C.

In the example of FIG. 1B, the hardware device 110 may be a non-networked hardware device and the hardware device 110 may not interact with the event generation system 120 (e.g., may not provide event data directly to the event generation system 120). For example, the hardware device 110 may not include a network interface and/or may not be configured to interact with the event generation system.

The event definition computing device 130 may obtain event data 132A generated by the hardware device 110, the one or more sensors 112, etc., may generate event data 132B based on the event data 132A, and may provide the event data 132B to the event generation system 120 via the intermediary system 150. By providing event data 132B to the event generation system 120 corresponding to event data generated by a non-networked hardware device (or sensors of a non-networked hardware device), the event definition computing device 130 may enable the analysis of event data generated by a such a hardware device.

II. Example Event Definition Computing Devices

Figure 2A:
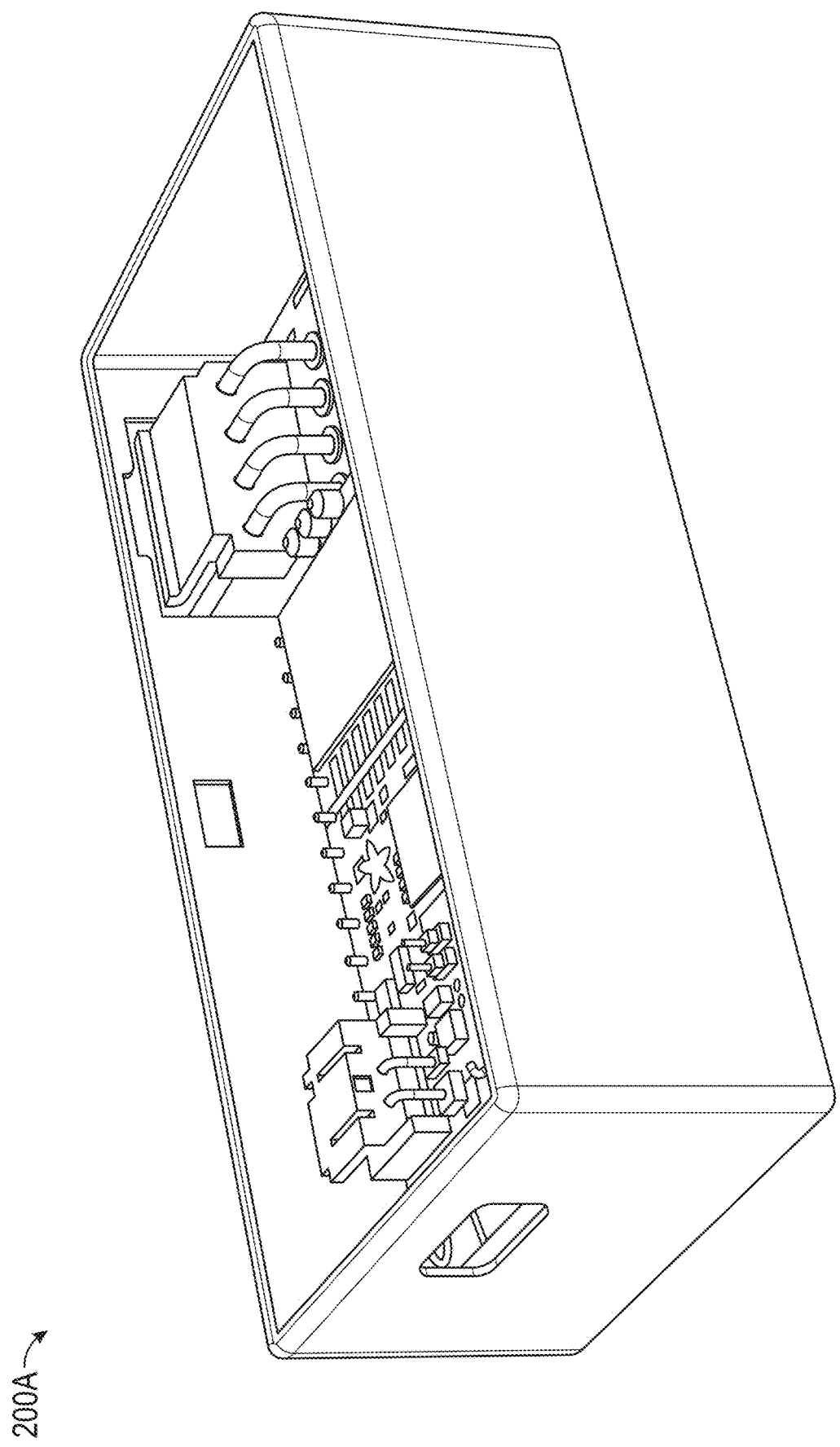
FIG. 2A is a pictorial diagram of an example event definition computing device according to some embodiments.

FIG. 2A depicts a pictorial diagram 200A of a side view of an example event definition computing device (e.g., within a housing). As illustrated in FIG. 2A, the event definition computing device may include a board (e.g., a circuit board) attached within an enclosure. The event definition computing device may include one or more ports (e.g., data ports on the enclosure) that can obtain data (e.g., via a physical connection) and can provide the data to the board. For example, the event definition computing device can obtain event data from a hardware device via the one or more ports.

Figure 2B:
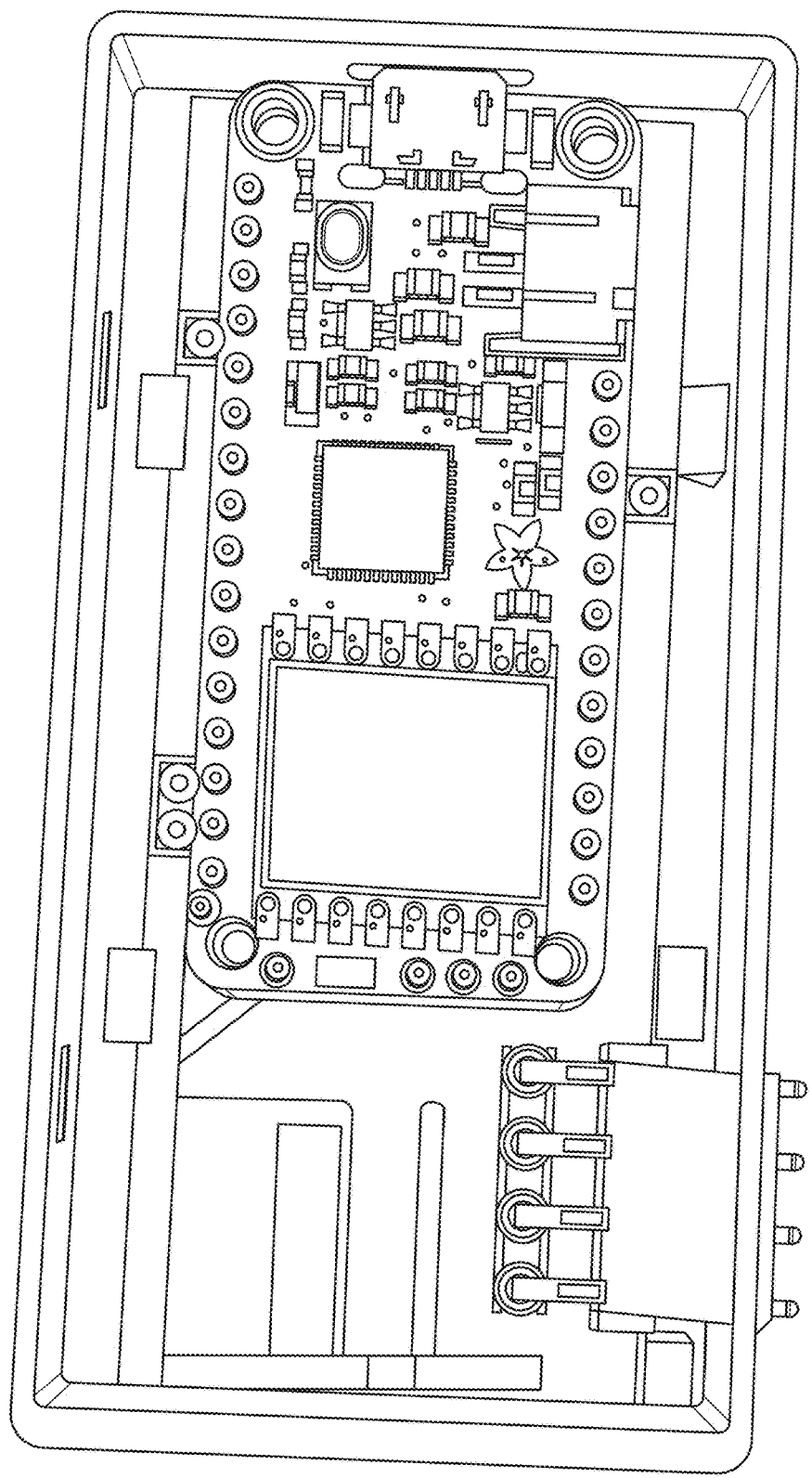
FIG. 2B is a pictorial diagram of an example event definition computing device according to some embodiments.

FIG. 2B depicts a pictorial diagram 200B of a top view of an example event definition computing device (e.g., within a housing). As illustrated in FIG. 2B, the event definition computing device may include a board (e.g., a circuit board) with one or more chips attached to the board. The board may include one or more pins. The one or more pins may connect the one or more chips to the board and may connect the one or more ports to the board.

Figure 2C:
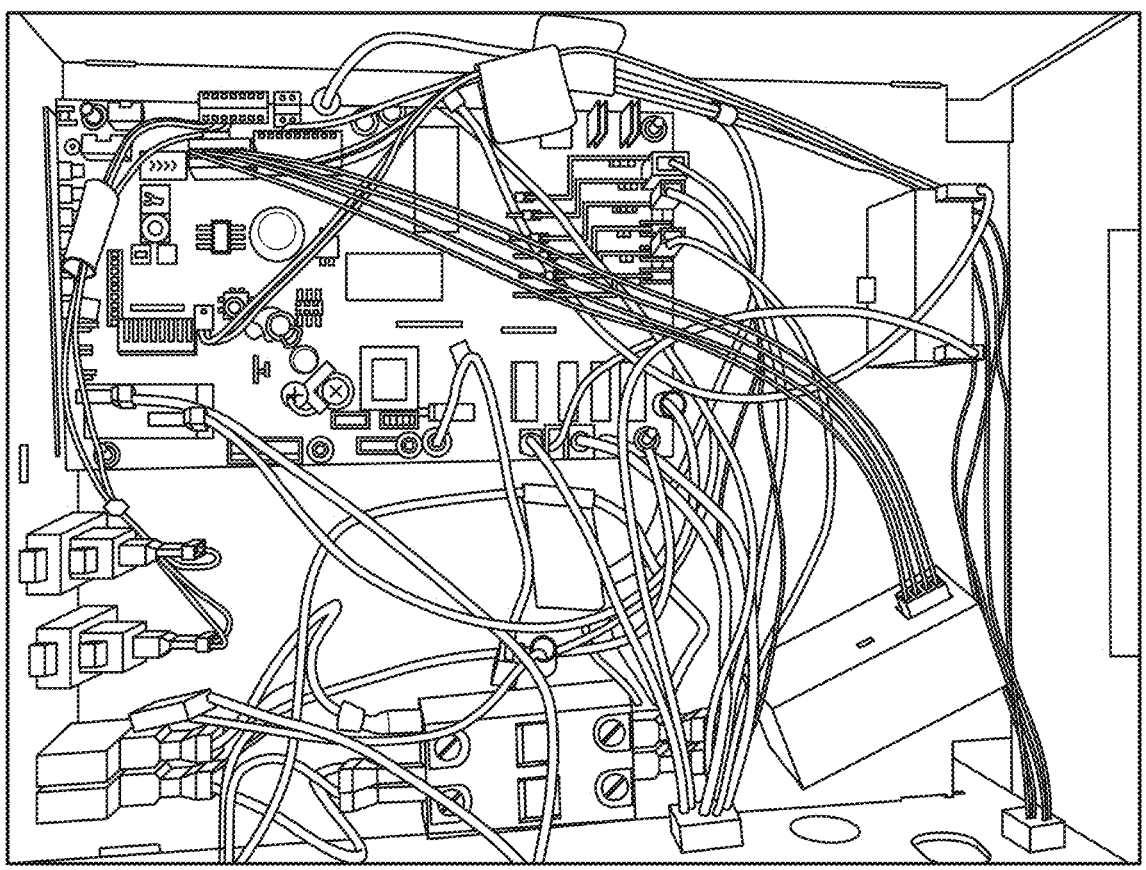
FIG. 2C is a pictorial diagram of an example event definition computing device with a wired connection to an example hardware device according to some embodiments.

FIG. 2C depicts a pictorial diagram 200C of a view of an example event definition computing device (e.g., within a housing) with a wired connection to an example hardware device (e.g., to a machine serial port of the example hardware device). For example, the example hardware device may be a freezer, a refrigerator, etc. and the example event definition computing device may be installed within the example hardware device and connected to a machine serial port of the example hardware device. As illustrated in FIG. 2C, the event definition computing device may be physically connected to the hardware device. The event definition computing device may be physically connected (e.g., via one or more wires) to a component (e.g., a motor, a sensor, a board, a power supply, one or more ports, a compressor, a condenser, an evaporator, a fan, a heating element, a light source, an igniter, an audio source, a display, etc.) of the hardware device. For example, one or more ports (e.g., one or more connectors) of the event definition computing device may be physically connected to one or more ports (e.g., one or more connectors) of the hardware device. It will be understood that the event definition computing device may be compatible with a plurality of different hardware devices including hardware devices with different ports, different pins, different port or pin configurations, etc., hardware devices that generate different event data, etc.

III. Event Definitions

Figure 3:
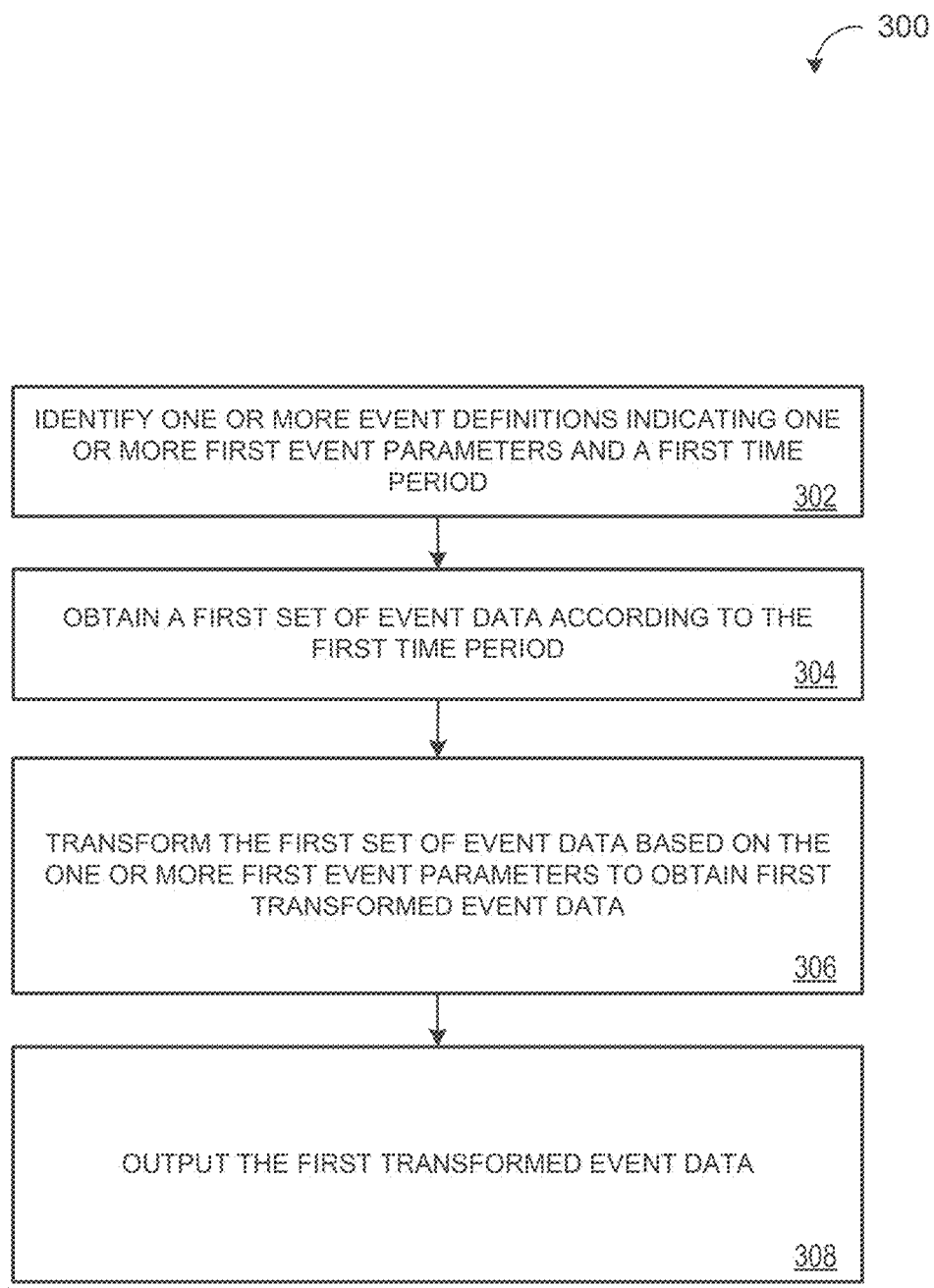
FIG. 3 is a flow diagram depicting example interactions for obtaining and transforming event data according to event definitions.

FIG. 3 is a flow diagram illustrative of a routine 300 implemented by the event definition computing device 130 to obtain and transform event data according to event definitions. Although described as being implemented by the event definition computing device 130 (e.g., a hardware processor of the event definition computing device 130), it will be understood that the elements outlined for routine 300 can be implemented by one or more computing devices or components, such as the event generation system 120. For example, the event definition computing device 130 may include memory hardware storing computer-executable instructions and the event definition computing device 130 may include at least one hardware processor such that execution of the computer-executable instructions by the at least one hardware processor causes the at least one hardware processor to execute the routine 300. Thus, the following illustrative embodiment should not be construed as limiting.

At block 302, the event definition computing device 130 identifies one or more event definitions indicating (e.g., including) one or more first event parameters and a first time period (e.g., to collect, provide, and/or generate event data and/or events. The event definition computing device 130 may obtain an input (e.g., from a user computing device). The event definition computing device 130 may identify (e.g., define) the one or more event definitions (e.g., the one or more first event parameters, the first time period, etc.) based on the input. For example, the one or more first event parameters may indicate a field, a field value, a sensor, data associated with a particular sensor of the first hardware device for generation (e.g., definition) of events (e.g., user-defined events, customized events, etc.). In some cases, the input may include instructions for the event definition computing device 130 to obtain event data from a first hardware device (e.g., a first physical machine) according the one or more event definitions.

The first hardware device may include one or more of a refrigerator, an ice machine, a warming wall, and/or a freezer. The event definition computing device 130 may be physically connected (e.g., wired) to the first hardware device via a wired connection. The event definition computing device 130 may be configured to physically connect to the first hardware device via a first port of the first hardware device and physically connect to a second hardware device via a second port of the second hardware device that is different as compared to the first port (e.g., having a different relative location, function, port type, etc.). As the event definition computing device 130 may be configured to connect to a plurality of hardware devices, the event definition computing device 130 may output respective event data according to the one or more first event parameters and the first time period for all or a portion of the plurality of hardware devices.

At block 304, the event definition computing device 130 obtains a first set of event data (e.g., a first set of raw machine data) according to the first time period. For example, the event definition computing device 130 may obtain the first set of event data from the first hardware device (e.g., via a wired connection between the event definition computing device 130 and the first hardware device).

In some cases, the event definition computing device 130 may prompt (e.g., command, instruct, request, etc.) the first hardware device to provide the first set of event data and may obtain the first set of event data in response to the prompt (e.g., requesting the first set of event data). For example, the event definition computing device 130 may obtain the first set of event data from memory of the first hardware device.

In some cases, the event definition computing device 130 may read (e.g., may pull) the first set of event data from the first hardware device. For example, the event definition computing device 130 may read particular event data from the first hardware device (e.g., a subset of the event data generated by the first hardware device) based on the one or more first event parameters.

The first hardware device may include one or more sensors that generate event data (e.g., sensor data). In some cases, the event definition computing device 130 may obtain the first set of event data directly from the one or more sensors. In some cases, the first hardware device may store event data in memory and the event definition computing device 130 may obtain the first set of event data from the memory of the first hardware device. In some cases, the first hardware device may process the event data (e.g., to generate error messages) and may store processed event data (e.g., error messages) in the memory and the event definition computing device 130 may obtain the first set of event data (e.g., the error messages) from the memory.

The first hardware device may be configured to output a second set of event data (e.g., a second set of raw machine data) according to one more event definitions (which may indicate one or more second event parameters and/or a second time period). The first hardware device may be configured to output the second set of event data using a first wireless networking protocol (e.g., WiFi) to a computing system. In some cases, the one or more first event parameters may be different as compared to the one or more second event parameters and/or the first time period may be different as compared to the second time period.

The first set of event data and/or the second set of event data may include sensor data, raw machine data, etc. For example, the first set of event data and/or the second set of event data may include one or more of voltage data, current data, humidity data, temperature data, image data, audio data, network connection status, update status, component status, water flow data, vibration data, identification data, error data, log data, alert data, and/or time data. The one or more event definitions may indicate a custom collection, ordering, etc. of the first set of event data and/or the second set of event data to define a custom event. For example, the one or more event definitions may indicate that a custom event is to include update status, audio data, and voltage data such that a computing system can monitor particular events (or features) of the hardware device over time.

Event data may be pushed by the first hardware device (e.g., via a first network connection) and pulled from the first hardware device (e.g., pulled via a wired connection by the event definition computing device 130 and routed via a second network connection by the event definition computing device 130). For example, the first hardware device may push a particular subset of event data to the computing system via the first network connection (e.g., firmware of the first hardware device may cause the first hardware device to push the particular subset of event data) and the event definition computing device 130 may pull the particular subset of event data from the first hardware device via the wired connection and route the particular subset of event data to the computing system via the second network connection. The computing system may receive at least two copies of the particular subset of event data (e.g., a copy from the event definition computing device 130 and a copy from the first hardware device).

At block 306, the event definition computing device 130 transforms the first set of event data based on the one or more first event parameters to obtain (e.g., generate) first transformed event data. For example, the event definition computing device 130 may filter, process, aggregate, etc. the first set of event data based on the one or more first event parameters (e.g., a customized event, a user-defined event, etc.) to obtain the first transformed event data.

In some cases, the first transformed event data may correspond to a subset of the second set of event data. For example, the event definition computing device 130 may filter the second set of event data to generate the first transformed event data.

In some cases, the event definition computing device 130 may transform the first set of event data to generate and/or define one or more events. For example, the event definition computing device 130 may generate one or more events based on the first set of event data and the one or more first event parameters. In some cases, the event definition computing device 130 may generate the one or more events by identifying one or more fields, field values, etc. of the first set of event data and grouping the identified fields, field values, etc. as events. The one or more first event parameters may indicate how to group the identified fields, field values, etc. and the event definition computing device 130 may utilize the one or more first event parameters to generate the one or more events.

At block 308, the event definition computing device 130 outputs the first transformed event data. In some cases, the event definition computing device 130 may output the generated one or more events. The event definition computing device 130 may output the first transformed event data using a second wireless networking protocol (e.g., LoRaWAN) that is different as compared to the first wireless networking protocol. Based on outputting the first transformed event data (e.g., to a computing system), an action may be automatically performed and/or a user interface may be automatically displayed based on the first transformed event data. For example, the event definition computing device 130 may cause an event to be triggered based on the first transformed event data and a corresponding action to be performed (e.g., reset of the first hardware device, initializing an indicator light of the first hardware device, etc.) and/or a user interface to be displayed (e.g., indicating the alert).

To output the first transformed event data, the event definition computing device 130 may route, using the second wireless networking protocol, the first transformed event data to an intermediary device (e.g., a network gateway device). The intermediary device may output the first transformed event data to a computing system. For example, the intermediary device may output the first transformed event data to the computing system using the first wireless networking protocol, a third wireless networking protocol, etc. In some cases, the event definition computing device 130 may output the first transformed event data directly to the computing system. In some cases, the event definition computing device may provide the first transformed event data and the first hardware device may provide the second set of event data to the same computing system.

In some cases, the event definition computing device 130 may output one or more events. For example, the event definition computing device 130 may output one or more events generated by the event definition computing device 130.

In some cases, the event definition computing device 130 may obtain, from a second hardware device, a third set of event data according to the first time period. The second hardware device may be configured to output, using the first wireless networking protocol, a fourth set of event data according to one or more third event parameters and a third time period. The event definition computing device 130 may generate second transformed event data based on the third set of event data and the one or more first event parameters. The event definition computing device 130 may output, using the second wireless networking protocol, the second transformed event data.

In some cases, the event definition computing device 130 may identify an update to the one or more first event parameters and/or the first time period (e.g., the update may include one or more third event parameters and/or a third time period). The event definition computing device 130 may obtain, from the first hardware device, a third set of event data according to the first time period (or the third time period where the update is an update to the first time period). The event definition computing device 130 may transform the third set of event data based on the one or more first event parameters (or the one or more third event parameters where the update is an update to the one or more first event parameters) to obtain second transformed event data. The event definition computing device 130 may output, using the second wireless networking protocol, the second transformed event data.

IV. Architecture

Figure 4:
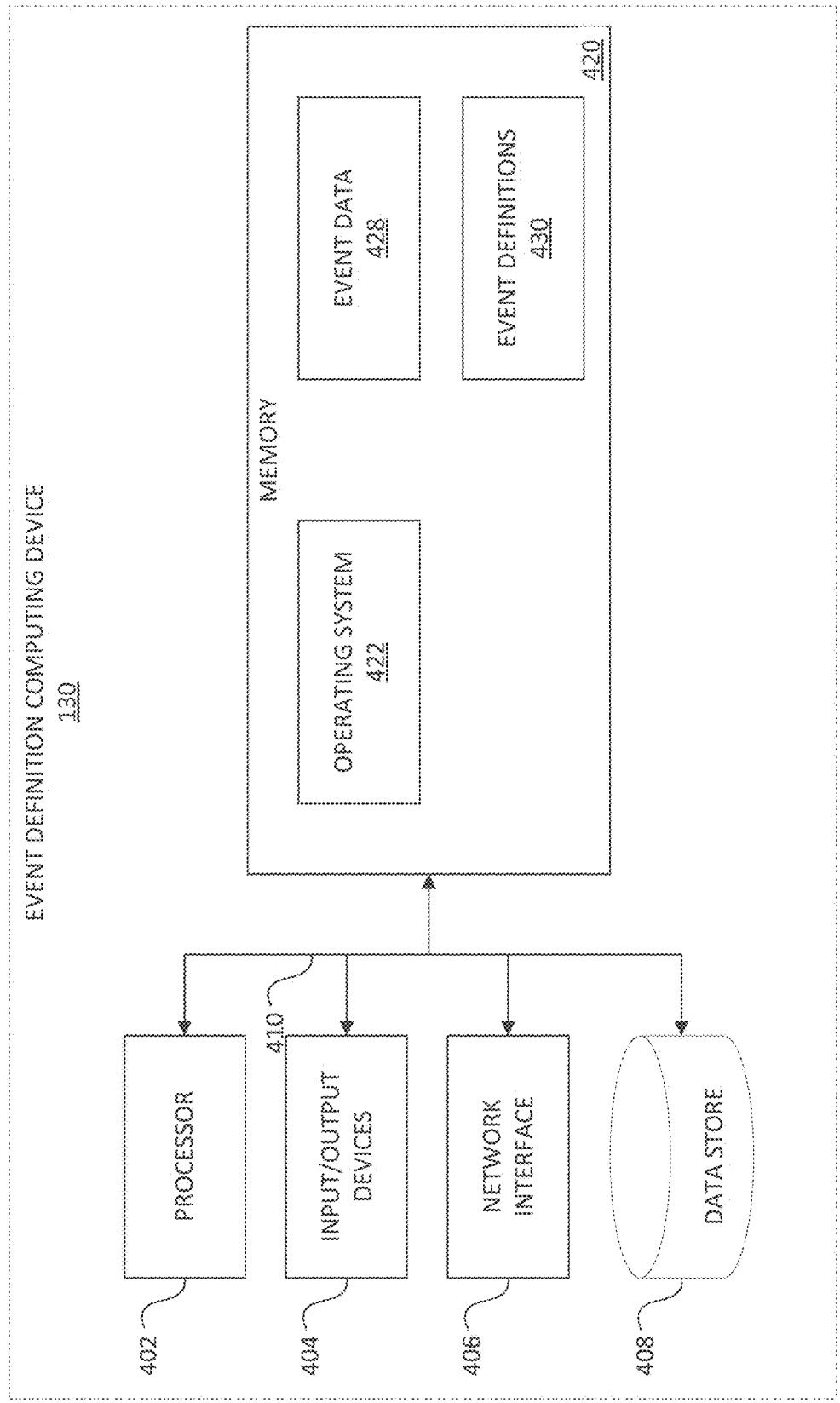
FIG. 4 depicts a general architecture of a computing device implementing the event definition computing device that is configured to obtain and transform event data according to event definitions.

FIG. 4 depicts a general architecture of an event definition computing device 130, which includes an arrangement of computer hardware and software components that may be used to implement aspects of the present disclosure. The event definition computing device 130 may include many more (or fewer) elements than those shown in FIG. 4. It is not necessary, however, that all of these elements be shown in order to provide an enabling disclosure.

As illustrated, the event definition computing device 130 includes a processor 402, input/output devices 404, a network interface 406, and a data store 408, all of which may communicate with one another by way of a communication bus 410 (e.g., a network). The network interface 406 may provide connectivity to one or more networks (such as the network 110B depicted in FIG. 1A and FIG. 1B) or computing systems and, as a result, may enable the event definition computing device 130 to receive and send information and instructions from and to other computing systems or services, such as the intermediary system 150 depicted in FIG. 1A and FIG. 1B. In some embodiments, the event definition computing device 130 may process prompts received from the user computing device 140.

The processor 402 may also communicate to and from a memory 420. The memory 420 may contain computer program instructions (grouped as modules or components in some embodiments) that the processor 402 may execute in order to implement one or more embodiments. The memory 420 generally includes RAM, ROM, and/or other persistent, auxiliary, or non-transitory computer-readable media. The memory 420 may store an operating system 422 that provides computer program instructions for use by the processor 402 in the general administration and operation of the event definition computing device 130. The memory 420 may further store specific computer-executable instructions and other information (which may be referred to herein as "modules") for implementing aspects of the present disclosure. For example, the memory 420 may include event data 428, event definitions 430, etc. In some embodiments, the event data 428, the event definitions 430, etc. may be obtained from internal or external data stores, either directly or via the communication bus 410.

It will be recognized that many of the components described in FIG. 4 are optional and that embodiments of the event definition computing device 130 may or may not combine components. Furthermore, components need not be distinct or discrete. Components may also be reorganized. For example, the event definition computing device 130 may be represented in a single physical device or, alternatively, may be split into multiple physical devices. In some embodiments, components illustrated as part of the event definition computing device 130 may additionally or alternatively be included in other computing devices (such as the intermediary system 150 of FIG. 1A and FIG. 1B), such that some aspects of the present disclosure may be performed by the event definition computing device 130 while other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. In addition, the separation of various system components in the implementations described above should not be understood as requiring such separation in all implementations, and it should be understood that the described components and systems can generally be integrated together in a single product or packaged into multiple products.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

In summary, various illustrative embodiments and examples have been disclosed. Although systems and methods (e.g., computer-implemented methods) have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. A computing device comprising:
    memory hardware storing computer-executable instructions; and
    at least one hardware processor, wherein execution of the computer-executable instructions by the at least one hardware processor causes the at least one hardware processor to:
        obtain, via a wireless connection, one or more first event definitions of the computing device, wherein the one or more first event definitions of the computing device comprise one or more first event parameters and a first time period;
        pull, from a first hardware device comprising first data processing hardware and first memory, via a wired connection between the computing device and the first hardware device, a first portion of a first set of event data according to the one or more first event definitions of the computing device, wherein the first hardware device is configured to, based on one or more second event definitions of the first hardware device as defined by firmware of the first hardware device, obtain a second portion of the first set of event data, transform the second portion of the first set of event data, and push, directly to a computing system, using a first wireless networking protocol, a first output, wherein the one or more second event definitions of the first hardware device comprise one or more second event parameters and a second time period;
        update the one or more first event definitions of the computing device based on an update received by the computing device via the wireless connection to obtain one or more updated event definitions of the computing device, wherein the one or more second event definitions of the first hardware device are updated based on a manual update of the firmware;
pull, from the first hardware device, via the wired connection between the computing device and the first hardware device, a second set of event data according to the one or more updated event definitions of the computing device;
transform the second set of event data based on the one or more updated event definitions of the computing device to obtain first transformed event data; and
route, to the computing system, using a second wireless networking protocol that is different as compared to the first wireless networking protocol, the first transformed event data, wherein, based on the first transformed event data, the first hardware device is instructed to, automatically, at least one of:
update a temperature of the first hardware device,
update a humidity of the first hardware device,
update an operating parameter of the first hardware device,
update operation of a sensor of the first hardware device,
reset the first hardware device,
update a response by the first hardware device to one or more commands, or
trigger a light of the first hardware device.

2. The computing device of claim 1, wherein the first hardware device is further configured to, based on the one or more second event definitions of the first hardware device, obtain a third set of event data, transform the third set of event data, and push, directly to the computing system, using the first wireless networking protocol, a second output, and wherein the first transformed event data corresponds to a subset of the third set of event data based on the one or more first event parameters.

3. The computing device of claim 1, wherein the execution of the computer-executable instructions by the at least one hardware processor further causes the at least one hardware processor to:
generate one or more events based on the first transformed event data,
wherein to route the first transformed event data, the execution of the computer-executable instructions by the at least one hardware processor further causes the at least one hardware processor to:
route the one or more events.

4. The computing device of claim 1, wherein the execution of the computer-executable instructions by the at least one hardware processor further causes the at least one hardware processor to:
prompt the first hardware device to provide the first portion of the first set of event data.

5. The computing device of claim 1, wherein, to pull the first portion of the first set of event data, the execution of the computer-executable instructions by the at least one hardware processor further causes the at least one hardware processor to:
read the first portion of the first set of event data from memory of the first hardware device.

6. The computing device of claim 1, wherein one or more sensors of the first hardware device generate sensor data, wherein the sensor data is stored in memory of the first hardware device, and wherein the first set of event data comprises a subset of the sensor data.

7. The computing device of claim 1, wherein to transform the second set of event data, the execution of the computer-executable instructions by the at least one hardware processor further causes the at least one hardware processor to one or more of:
aggregate the second set of event data; or
filter the second set of event data.

8. The computing device of claim 1, wherein, to route the first transformed event data, the execution of the computer-executable instructions by the at least one hardware processor further causes the at least one hardware processor to:
provide, using the second wireless networking protocol, the first transformed event data to a network gateway device, wherein the network gateway device outputs the first transformed event data to the computing system.

9. The computing device of claim 1, wherein each of the first portion of the first set of event data and the second portion of the first set of event data comprises a third portion of the first set of event data.

10. The computing device of claim 1, wherein execution of the computer-executable instructions by the at least one hardware processor further causes the at least one hardware processor to route a second output to the computing system based on the first portion of the first set of event data, wherein the first output comprises one or more first events, wherein the second output comprises one or more second events, wherein each of the one or more first events and the one or more second events comprises a particular event, and wherein the computing system receives at least two copies of the particular event.

11. The computing device of claim 1, wherein the execution of the computer-executable instructions by the at least one hardware processor further causes the at least one hardware processor to:
obtain, from a user computing device, an input; and
define at least one of the one or more first event parameters or the first time period based on the input.

12. The computing device of claim 1, wherein a machine learning model indicates an alert based on the first transformed event data.

13. The computing device of claim 1, wherein the computing device physically connects to the first hardware device via a first port of the first hardware device and physically connects to a second hardware device via a second port of the second hardware device that is different from the first port.

14. The computing device of claim 1, wherein the execution of the computer-executable instructions by the at least one hardware processor further causes the at least one hardware processor to:
pull, from a second hardware device comprising second data processing hardware and second memory, via a wired connection between the computing device and the second hardware device, a first portion of a third set of event data according to the one or more updated event definitions of the computing device, wherein the second hardware device is configured to, based on one or more third event definitions of the second hardware device, as defined by firmware of the second hardware device, obtain a second portion of the third set of event data, transform the second portion of the second set of event data, and push, directly to the computing system, using the first wireless networking protocol, an output;

transform the first portion of the third set of event data based on the one or more updated event definitions of the computing device to obtain second transformed event data; and route, to the computing system, using the second wireless networking protocol, the second transformed event data.

15. The computing device of claim 1, wherein the execution of the computer-executable instructions by the at least one hardware processor further causes the at least one hardware processor to:
instruct a reset of the first hardware device based on the first transformed event data.

16. The computing device of claim 1, wherein the computing device is compatible with a plurality of hardware devices that have different port configurations or different pin configurations.

17. The computing device of claim 1, wherein the first wireless networking protocol comprises Wi-Fi, and wherein the second wireless networking protocol comprises LoRaWAN.

18. The computing device of claim 1, wherein the second set of event data comprises one or more of:
voltage data;
current data;
humidity data;
temperature data;
image data;
audio data;
network connection status;
update status;
component status;
water flow data;
vibration data;
identification data;
error data;
log data;
alert data; or
time data.

19. The computing device of claim 1, wherein the first hardware device comprises:
a refrigerator;
an ice machine;
a warming wall; or
a freezer.

20. The computing device of claim 1, wherein the second set of event data comprises raw machine data.

21. The computing device of claim 1, wherein an action is automatically performed or a user interface is automatically displayed based on the first transformed event data.

22. The computing device of claim 1, wherein execution of the computer-executable instructions by the at least one hardware processor further causes the at least one hardware processor to output respective event data for a plurality of hardware devices according to the one or more first event definitions of the computing device.

23. The computing device of claim 1, wherein the one or more first event parameters indicate one or more of:
a field;
a field value; or
data associated with a particular sensor of the first hardware device.

24. The computing device of claim 1, wherein to transform the first set of event data, the execution of the computer-executable instructions by the at least one hardware processor further causes the at least one hardware processor to transform the first set of event data based on one or more of:
a customized event; or
a user-defined event.

25. A computer-implemented method comprising:
obtaining, by data processing hardware of a computing device, via a wireless connection, one or more first event definitions of the computing device, wherein the one or more first event definitions of the computing device comprise one or more first event parameters and a first time period;

pulling, by the data processing hardware, from a first hardware device comprising data processing hardware and memory, via a wired connection between the computing device and the first hardware device, a first portion of a first set of event data according to the one or more first event definitions of the computing device, wherein the first hardware device is configured to, based on one or more second event definitions of the first hardware device, obtain a second portion of the first set of event data and push, to a computing system, using a first wireless networking protocol, via a first network connection, a first output based on the second portion of the first set of event data;

updating the one or more first event definitions of the computing device based on an update received by the computing device via the wireless connection to obtain one or more updated event definitions of the computing device;

pulling, from the first hardware device, via the wired connection between the computing device and the first hardware device, a second set of event data according to the one or more updated event definitions of the computing device;

transforming the second set of event data based on the one or more updated event definitions of the computing device obtain first transformed event data; and routing, to the computing system, using a second wireless networking protocol, via a second network connection, the first transformed event data, wherein, based on the first transformed event data, the first hardware device is instructed to, automatically, at least one of:
update a temperature of the first hardware device,
update a humidity of the first hardware device,
update an operating parameter of the first hardware device,
update operation of a sensor of the first hardware device,
reset the first hardware device,
update a response by the first hardware device to one or more commands, or
trigger a light of the first hardware device.

26. A computing device comprising:
memory hardware storing computer-executable instructions; and
at least one hardware processor, wherein execution of the computer-executable instructions by the at least one hardware processor causes the at least one hardware processor to:
receive, via a wireless connection, from a user computing device, an input;
identify one or more first event definitions of the computing device based at least in part on the input, wherein the one or more first event definitions of the computing device comprise one or more first event parameters and a first time period, wherein the one or more first event parameters indicate at least one of a field, a field value, or a particular sensor for definition of events, and wherein the first time period indicates a time period for providing the events;

pull, from a physical machine, via a wired connection between the computing device and the physical machine, a first portion of a first set of raw machine data according the one or more first event definitions of the computing device, wherein the physical machine, based on one or more second event definitions of the physical machine different from the one or more first event definitions of the computing device, obtains a second portion of the first set of raw machine data and pushes, to a computing system, using a first wireless networking protocol, an output based on the second portion of the first set of raw machine data;

update the one or more first event definitions of the computing device based on an update received by the computing device via the wireless connection to obtain one or more updated event definitions of the computing device, wherein the one or more first event definitions of the computing device are maintained and updated by the computing device, and wherein the one or more second event definitions of the physical machine are maintained and updated by the physical machine;

pull, from the physical machine, via the wired connection between the computing device and the physical machine, a second set of raw machine data according to the one or more updated event definitions of the computing device;

define one or more events based on the second set of raw machine data and the one or more updated event definitions of the computing device; and route, to the computing system, using a second wireless networking protocol that is different as compared to the first wireless networking protocol, the one or more events, wherein, based on the one or more events, the physical machine is instructed to, automatically, at least one of:

update a temperature of the physical machine, update a humidity of the physical machine, update an operating parameter of the physical machine, update operation of a sensor of the physical machine, reset the physical machine, update a response by the physical machine to one or more commands, or trigger a light of the physical machine.

* * * * *